March 18, 1952     F. PENA     2,589,857
COMBINATION FAUCET
Filed Nov. 20, 1947
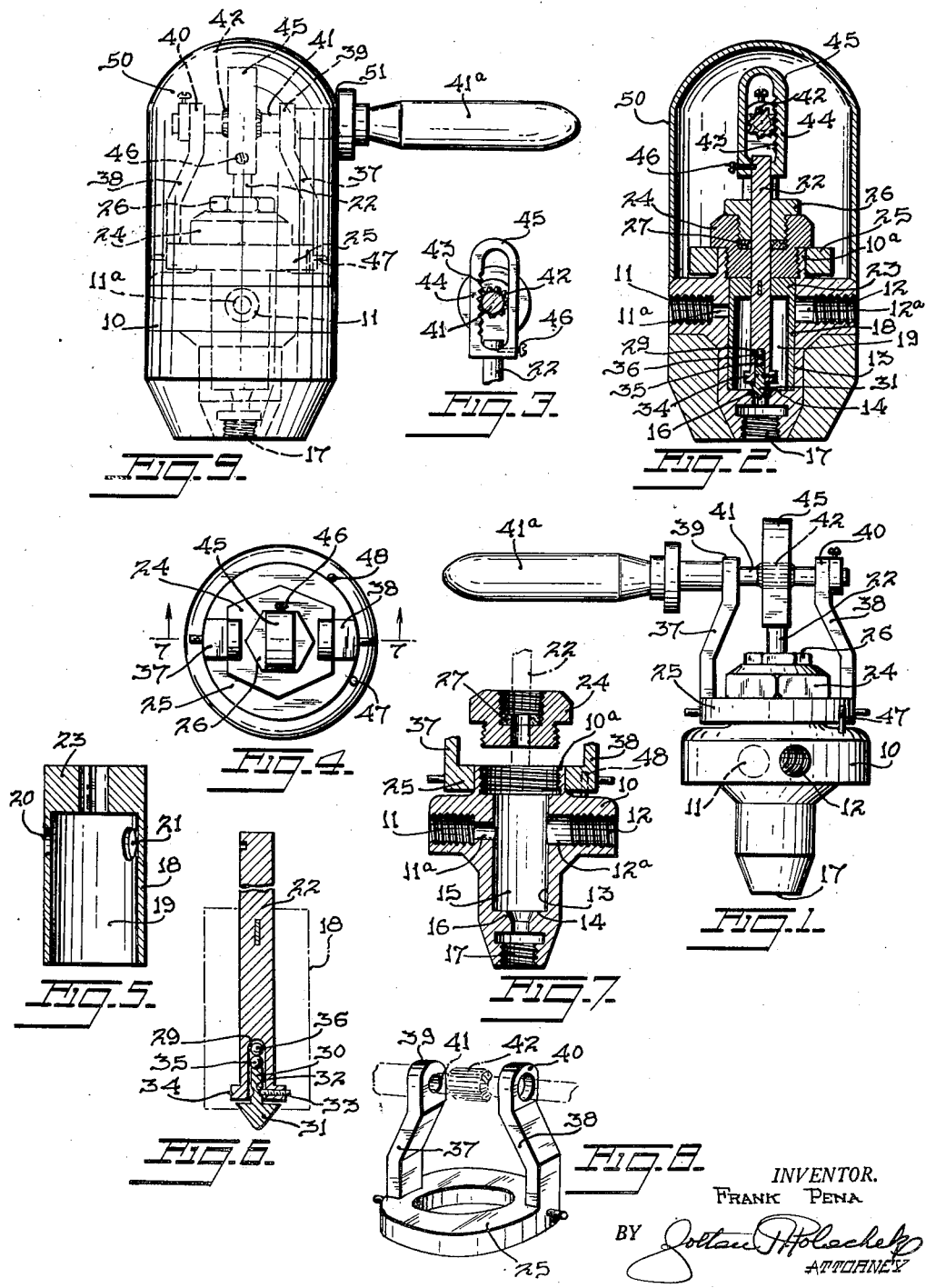
INVENTOR.
FRANK PENA Patented Mar. 18, 1952

2,589,857

UNITED STATES PATENT OFFICE 2,589,857

COMBINATION FAUCET

Frank Pena, Brooklyn, N. Y.

Application November 20, 1947, Serial No. 787,118

5 Claims. (Cl. 277—11)

This invention relates to an improved faucet valve for controlling the discharge of hot and cold water.

The invention relates more particularly to a construction which regulates by manual operation from a single handle the volume of water flow as well as the relative proportions of hot and cold water.

One of the objects of the invention is to provide an efficient, simple and inexpensive valve which can be operated to deliver either cold or hot water, or water mixed from separate hot and cold water supplies, in any volume desired, by a central manual operation of a single valve handle.

Another object of the invention is to provide a flow controlling valve, with a volume control, a mixing control which operates separately from the volume control, and a handle constructed to operate either control without varying the adjustment of the other control.

A further object of the invention is to provide a flow controlling valve, with a plunger valve for regulating the volume of water discharged, and a cylindrical valve which regulates the source of water flowing to the plunger valve seat and can be operated to vary the discharge of hot and cold water, so that the temperature of the water discharged may be regulated at will, without increasing or decreasing the volume of water discharged from the valve.

A still further object of the invention is to provide a valve having a handle which may be swung on a pivotal center to modify the temperature of water, and which may be turned on its own axis to vary the volume of water discharged on the basis of the manual temperature adjustment made.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a side elevational view of the invention.

Fig. 2 is a vertical sectional view.

Fig. 3 is a detail side elevation of the pinion and rack operating means of the plunger valve.

Fig. 4 is a plan view, showing the means for operating the cylindrical mixing valve.

Fig. 5 is a vertical sectional view of the mixing valve, enlarged.

Fig. 6 is a similar view of the plunger valve.

Fig. 7 is a cross sectional view, taken on line 7—7 of Fig. 1, looking in the direction of the arrows, showing the relation of the ports of the mixing valve cylinder to the ports of the enclosing valve housing.

Fig. 8 is a perspective view of the yoke which supports the handle for rotative movement around its own major axis, and which couples the handle to the cylindrical mixing valve to regulate the water temperature.

Fig. 9 is a side elevation of a modified form, showing a protective hood.

Referring to the drawing, which illustrates the practical embodiment of the invention, 10 designates a valve housing having a cold water intake 11 and a hot water intake 12.

The housing 10 is formed with a cylindrical wall 13, having a shoulder 14 at the inner end thereof, and a cylindrical flow passage 15 concentric with said wall 13, which discharges through the conical valve seat 16 to the outlet or spout 17.

A cylindrical or rotary valve 18 is mounted to turn in sealing fit with the wall 13, and against the shoulder 14, and is provided with a central flow chamber 19, which is concentric with the flow passage 15. This cylindrical valve is formed with a port 20 in its hollow wall for registration with the cold water port 11ª of the valve housing, and another port 21, for registration with the hot water port 12ª of the valve housing.

A plunger rod 22 has a sliding fit through the upper end wall 23 of the cylindrical valve 18, and is keyed thereto against relative rotation. A nut 24 is screw threaded into the upper end of the valve housing 10 and against the flat top 10ª thereof, and very close to swivel ring 25, which is seated on the housing 10. A gland nut 26 is threaded into the top of the nut 24 to compress a gland packing 27 around the plunger rod 22.

The lower end of the plunger rod 22 is formed with an axial bore 29, which receives the stem 30 of the conical plunger valve member 31. This stem is provided with a circumscribing groove 32, which receives the inner end of the set screw 33, which is threaded through the collar 34. The inner end of the valve stem 30 as a bearing against the thrust ball 35 which has a bearing against another ball 36, both being enclosed within the bore or axial hole 29. The conical plunger valve 31 is adapted to engage the conical valve seat 16.

The swivel ring 25 has bearing side arms 37 and 38, which are formed with aligned bearings 39 and 40, through which the handle rod 41 extends. This handle rod is formed or provided with an operating gear pinion 42, which engages the rack teeth 43 formed on the vertical side bar 44 of the operating yoke 45, which is coupled to the upper end of the plunger rod 22 by means of the set screw 46.

The housing 10 is provided with external stops or pins 47 and 48, which are located thereon to fix the limits of turning to the right or left of the cylindrical valve. These stops or pins are engaged by the swivel ring 25.

To allow cold water to enter the housing 10, the cylindrical valve 18 is turned by swinging the handle 41a around in a horizontal plane so as to turn the swivel ring 25 until the pin stop 48. In this position the cold water port in the cylindrical valve will coincide with the cold water port in the housing 10, that is assuming the cold water inlet to be on the left side. It works the same on either side. Example in operation: The handle 41a is moved in a horizontal plane to the left or right from whatever position it was left in previously; thus if handle 41a indicated warm on the hood and slightly warmer or colder is desired, move the handle in the direction of the hot or cold water inlet. When handle 41a is moved all the way to the left, the cold water port in the cylindrical valve and the cold water port in the housing will be exactly in line hence only cold water will enter the chamber 19 as the hot water port in the valve is out of alignment with the hot water port in the housing and does not permit hot water to enter the chamber 19. When moving the handle to the right in the same horizontal plane, the cold water port in the cylindrical valve starts moving out of alignment with the cold water port in the housing at the same time that the hot water port in the valve starts to align with the hot water port in the housing allowing the hot water to start flowing into the chamber, thus the water in the chamber becomes warmer as the handle moves to the right until the pin stop 47 when only hot water will enter the chamber.

As the handle moves along to the right, the cold water flow into the chamber 19 will be diminished and the flow of the hot water into the chamber will be increased, thus the water in the chamber becomes warmer as the handle is moved all the way to a stop when only hot water will enter the chamber, as the cold water port will then be completely out of alignment with the cold water port in the housing, thus allowing no cold water to pass into the chamber.

The object of bearings 35 and 36 is that the point of contact being so slight in comparison with the contact of conical valve on the seat that it will enable the user to move the handle in a horizontal plane to any position desired, the circumscribing groove and the greater contact of valve against the seat will enable it to stay in place, while the plunger rod rotates on the very slight friction of bearings 35 and 36.

In Fig. 9, a hood 50 is shown which is provided with a slot 51, through which the handle rod 41 extends. The length of this slot determines the limit of movement of the cylindrical or rotary valve.

The invention thus provides a faucet construction having a single central operating handle which controls the volume of water discharged and the temperature mixture of the water discharged. The valve may be varied at will without changing the temperature adjustment, and the temperature adjustment may be varied without changing the volume discharge adjustment. The parts are so designed that replacement of worn parts may be accomplished with little effort and at a moderate expense. The construction permits of the production of a low cost product, which will give efficient service in use.

While the construction does permit of independent operation of the volume control or discharge valve and the mixture control valve, it also permits of simultaneous operation of both valves in any wanted degree of temperature adjustment.

One of the many advantages of this faucet is, that it can be shut in any position, thus allowing the user to graduate and keep the temperature of the water as long as desired regardless of how many times the valve is opened and closed. Another advantage is that as one port opens the other one closes simultaneously thus making it the simplest and surest way of changing the temperature of the water.

One of the major objects of this invention is to provide by the means of the single handle, the regulation of hot and cold water in an instant's time and do away with the slower and not so sure way of the old two handle style. A slight movement of the handle will automatically enlarge the intake of one port while the other one will diminish, thus changing the temperature of the water instantly.

Another object of this faucet is to do away with the replacement of worn gaskets that lead to a leaking faucet, the metal conical valve 31 eliminates the need of such replacements as it will seal on the seat indefinitely against leakage.

The simplicity and efficiency of this type faucet makes it ideal for use for sinks, wash tubs and especially for the shower, where the water temperature is of importance. A slight movement of the handle of this faucet will shut and open water discharge at the desired temperature and volume. The temperature of water will not change by opening or closing, but only when the handle is moved in a horizontal plane to right or left, will the temperature change.

While I have illustrated and described the preferred embodiments of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. A faucet construction comprising a housing having an internal chamber with hot and cold water intake ports, a plunger valve for controlling discharge from the chamber, a cylindrical rotary valve controlling flow from the intake ports into the chamber, a ring swivelled on the housing, bearing arms rigid with the ring, a handle rod mounted to turn on the bearing arms and capable of turning the swivel ring, a yoke engaged by the handle rod, a rack on the yoke, and a gear pinion on the handle rod engaging the rack, said plunger valve being connected with said yoke and keyed to turn the cylindrical rotary valve, whereby either valve may be operated from the handle and both valves may be simultaneously operated.

2. A faucet construction comprising a housing having an internal chamber with opposed hot and cold water intake ports leading into said chamber and a bottom discharge opening leading from said chamber, a cylindrical rotary valve within said chamber controlling the flow of water from said ports into said chamber, a valve seat within said housing at the top of said discharge opening, a rotary plunger valve vertically slidably extended into said housing and said cylindrical valve to seat at its bottom end on said valve seat, said cylindrical valve and said plunger valve being keyed together to rotate as a unit, a ring rotatively mounted on said housing, spaced bearing arms extended upward from said ring, a yoke on the top end of said plunger valve and formed with a rack; a handle rod turnably supported in said bearing arms and extended through said yoke, and a gear on said handle rod and engaging said rack.

3. A faucet construction comprising a housing having an internal chamber with opposed hot and cold water intake ports leading into said chamber and a bottom discharge opening leading from said chamber, a cylindrical rotary valve within said chamber controlling the flow of water from said ports into said chamber, a valve seat within said housing at the top of said discharge opening, a rotary plunger valve vertically slidably extended into said housing and said cylindrical valve to seat at its bottom end on said valve seat, said cylindrical valve and said plunger valve being keyed together to rotate as a unit, a ring rotatively mounted on said housing, spaced bearing arms extended upward from said ring, a yoke on the top end of said plunger valve and formed with a rack; a handle rod turnably supported in said bearing arms and extended through said yoke, and a gear on said handle rod and engaging said rack, said plunger valve comprising a vertically extended plunger rod, and a valve member rotatively mounted on the bottom end of said plunger rod.

4. A faucet construction comprising a housing having an internal chamber with opposed hot and cold water intake ports leading into said chamber and a bottom discharge opening leading from said chamber, a cylindrical rotary valve within said chamber controlling the flow of water from said ports into said chamber, a valve seat within said housing at the top of said discharge opening, a rotary plunger valve vertically slidably extended into said housing and said cylindrical valve to seat at its bottom end on said valve seat, said cylindrical valve and said plunger valve being keyed together to rotate as a unit, a ring rotatively mounted on said housing, spaced bearing arms extended upward from said ring, a yoke on the top end of said plunger valve and formed with a rack; a handle rod turnably supported in said bearing arms and extended through said yoke, and a gear on said handle rod and engaging said rack, said plunger valve comprising a vertically extended plunger rod, and a valve member rotatively mounted on the bottom end of said plunger rod, said rotative mounting of said valve member on said plunger rod comprising a stem extended vertically from said valve member, a bore extended upward from the bottom end of said plunger rod and into which said stem extends, balls within said bore between the top end of said stem and the wall of said plunger rod defining the top of said bore, and means rotatively retaining said stem in position in said bore and against said balls.

5. A faucet construction comprising a housing having an internal chamber with opposed hot and cold water intake ports leading into said chamber and a bottom discharge opening leading from said chamber, a cylindrical rotary valve within said chamber controlling the flow of water from said ports into said chamber, a valve seat within said housing at the top of said discharge opening, a rotary plunger valve vertically slidably extended into said housing and said cylindrical valve to seat at its bottom end on said valve seat, said cylindrical valve and said plunger valve being keyed together to rotate as a unit, a ring rotatively mounted on said housing, spaced bearing arms extended upward from said ring, a yoke on the top end of said plunger valve and formed with a rack; a handle rod turnably supported in said bearing arms and extended through said yoke, and a gear on said handle rod and engaging said rack, said plunger valve comprising a vertically extended plunger rod, and a valve member rotatively mounted on the bottom end of said plunger rod, said rotative mounting of said valve member on said plunger rod comprising a stem extended vertically from said valve member, a bore extended upward from the bottom end of said plunger rod and into which said stem extends, balls within said bore between the top end of said stem and the wall of said plunger rod defining the top of said bore, and means rotatively retaining said stem in position in said bore and against said balls, said retaining means comprising a set screw threaded radially into the bottom of said plunger rod, and a groove formed about said stem and into which the inner end of said set screw engages.

FRANK PENA.

REFERENCES CITED

The following references are of record in the file of this patent:

UNITED STATES PATENTS

| Number | Name | Date |
|---|---|---|
| 742,327 | Huye | Oct. 27, 1903 |
| 960,558 | Koken | June 7, 1910 |
| 1,693,758 | Hennessey | Dec. 4, 1928 |
| 1,882,953 | Saelzler | Oct. 18, 1932 |
| 2,373,702 | Moen | Apr. 17, 1945 |

FOREIGN PATENTS

| Number | Country | Date |
|---|---|---|
| 104,548 | Sweden | of 1942 |